(12) United States Patent
Bender et al.

(10) Patent No.: US 9,563,913 B1
(45) Date of Patent: Feb. 7, 2017

(54) LUGGAGE CONTENTS RECOMMENDATIONS AND TRACKING

(71) Applicant: International Business Machines Corporation, Armonk, NY (US)

(72) Inventors: Michael Bender, Rye Brook, NY (US); Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/226,208

(22) Filed: Aug. 2, 2016

Related U.S. Application Data

(63) Continuation of application No. 15/053,249, filed on Feb. 25, 2016, now Pat. No. 9,454,728, which is a continuation of application No. 14/949,974, filed on Nov. 24, 2015.

(51) Int. Cl.
*G08B 1/08* (2006.01)
*G06Q 30/06* (2012.01)
*H04W 4/00* (2009.01)

(52) U.S. Cl.
CPC ...... *G06Q 30/0631* (2013.01); *G06Q 30/0639* (2013.01); *H04W 4/008* (2013.01)

(58) Field of Classification Search
CPC .............. G01N 2001/024; G08B 13/1427; B65G 2201/02; A45C 7/0086; A45F 5/00; H04W 4/008; G06Q 30/0631; G06Q 30/0639; G06N 5/04
USPC ........................................... 340/539.13, 5.92
See application file for complete search history.

(56) References Cited

U.S. PATENT DOCUMENTS

| 5,299,116 | A | 3/1994 | Owens et al. |
|---|---|---|---|
| 6,010,239 | A | 1/2000 | Hardgrave et al. |
| 6,624,752 | B2 | 9/2003 | Klitsgaard et al. |
| 7,489,244 | B2 | 2/2009 | August et al. |
| 8,810,392 | B1 | 8/2014 | Teller et al. |
| 9,177,186 | B1 * | 11/2015 | Rinehart .......... G06K 19/07758 |
| 9,454,728 | B1 | 9/2016 | Bender et al. |

(Continued)

OTHER PUBLICATIONS

Future Travel Experience, "Airbus unveils RFID 'Bag2Go' that can be tracked from an iPhone app", Jun. 13, 2013, 3 pages, <http://www.futuretravelexperience.com/2013/06/airbus-unveils-rfid-bag2go-that-can-be-tracked-from-an-iphone-app/>.

(Continued)

*Primary Examiner* — Naomi Small
(74) *Attorney, Agent, or Firm* — Edward J. Wixted, III

(57) ABSTRACT

In an approach for suggesting an item to pack, a processor receives an indication that a user is packing a first item of luggage, wherein the indication includes information about a trip. A processor generates a packing list based on the information about the trip. A processor receives a request to link the first item of luggage and a second item of luggage for the trip. A processor links the first and second items of luggage such that contents of each item of luggage are jointly compared to the packing list. A processor receives, via a short-range point-to-point communication reader of the first item of luggage, a signal from a short-range point-to-point communication device operably affixed to a first item. A processor identifies the first item based on the signal. A processor determines that the first item is an item of the packing list.

1 Claim, 4 Drawing Sheets

(56) References Cited

U.S. PATENT DOCUMENTS

| | | | |
|---|---|---|---|
| 2003/0149526 A1* | 8/2003 | Zhou | G01S 5/0027 701/408 |
| 2005/0099309 A1 | 5/2005 | Hum et al. | |
| 2006/0087432 A1* | 4/2006 | Corbett | G06Q 10/08 340/572.1 |
| 2008/0201244 A1 | 8/2008 | Johnson | |
| 2008/0204232 A1 | 8/2008 | Agrawal et al. | |
| 2008/0204233 A1* | 8/2008 | Agrawal | G06Q 10/08 340/572.1 |
| 2009/0243853 A1 | 10/2009 | Breslau et al. | |
| 2009/0248549 A1 | 10/2009 | Breslau et al. | |
| 2009/0276089 A1* | 11/2009 | Bartholomew | G06Q 10/02 700/235 |
| 2010/0078475 A1 | 4/2010 | Lin et al. | |
| 2010/0174759 A1 | 7/2010 | Piccinini et al. | |
| 2011/0040655 A1 | 2/2011 | Hendrickson | |
| 2011/0040757 A1 | 2/2011 | Kossi et al. | |
| 2012/0288847 A1* | 11/2012 | Huttenberger | G09B 19/00 434/365 |
| 2013/0346255 A1 | 12/2013 | Hayden et al. | |
| 2014/0009291 A1 | 1/2014 | Requist et al. | |
| 2014/0057646 A1 | 2/2014 | Vaananen | |
| 2014/0157526 A1 | 6/2014 | Larmo et al. | |

OTHER PUBLICATIONS

Rowe, "The luggage that's impossible for airlines to lose—because its got a built-in GPS tracker", DailyMail.com, Jun. 14, 2013, 19 pages, <http://www.dailymail.co.uk/sciencetech/article-2341600/The-luggage-GPS-tracking-device-makes-impossible-lost.html>.

Rush, "RFID can improve efficiencies and deliver cost savings in warehouses.", RFID Journal, Innovative Warehouse Solutions, Mar. 1, 2010, 1 page, <http://www.rfidjournal.com/articles/view?7426>.

"Active Shelf System: RFID Tracking for Retail Inventories", © Barcoding Inc. 2003-2011, Printed Sep. 15, 2015, 2 pages, <http://www.barcoding.com/rfid/active-shelf.shtml>.

"Airbus initiative aims to make lost luggage a thing of the past", Airbus, Dec. 10, 2013, 3 pages, <http://www.airbus.com/newsevents/news-events-single/detail/airbus-initiative-aims-to-make-lost-luggage-a-thing-of-the-past/>.

"SPEDE RFID Crane Locator System", © 2009, SPEDE Technologies, 1 page, <www.spede.com/documents/CraneLocatorSystemBrochure.pdf>.

U.S. Appl. No. 14/949,974, filed Nov. 24, 2016; Entitled "Luggage Contents Recommendations and Tracking".

* cited by examiner

LUGGAGE CONTENTS RECOMMENDATIONS AND TRACKING

BACKGROUND

The present invention relates generally to the field of traveling and packing, and more particularly to utilizing short-range point-to-point communication to inventory items in luggage, provide recommendations, and to generate alerts.

The Internet of Things (IoT) is the network of physical objects or "things" embedded with electronics, software, sensors, and network connectivity, which enables these objects to collect and exchange data.

Short-range point-to-point communication technologies include, for example radio-frequency identification (RFID) and near field communication (NFC). Other similar technologies include Bluetooth®.

SUMMARY

Aspects of an embodiment of the present invention disclose a method, computer program product, and computing system for suggesting an item to pack in an item of luggage. A processor receives a first indication that a user is packing a first item of luggage for a trip, wherein the indication includes information about the trip. A processor generates a packing list based on, at least, the information about the trip. A processor receives a request to link the first item of luggage and a second item of luggage for the trip. A processor links the first item of luggage and the second item of luggage such that contents of each respective item of luggage are jointly compared to the packing list. A processor receives, via a short-range point-to-point communication reader of the first item of luggage, a signal from a short-range point-to-point communication device operably affixed to a first item. A processor identifies the first item based on the signal. A processor compares the first item to the packing list. A processor determines that the first item is an item listed on the packing list.

DETAILED DESCRIPTION

Embodiments of the present invention recognize that luggage, and items placed in luggage, are frequently misplaced, lost, or separated. As described herein is an approach to log items stored in luggage, provide recommendations of items to add and remove to luggage based on information about the trip and/or past preferences, and provide alerts when issues have arisen that may result in lost or misplaced luggage.

The present invention will now be described in detail with reference to the Figures.

Figure 1:
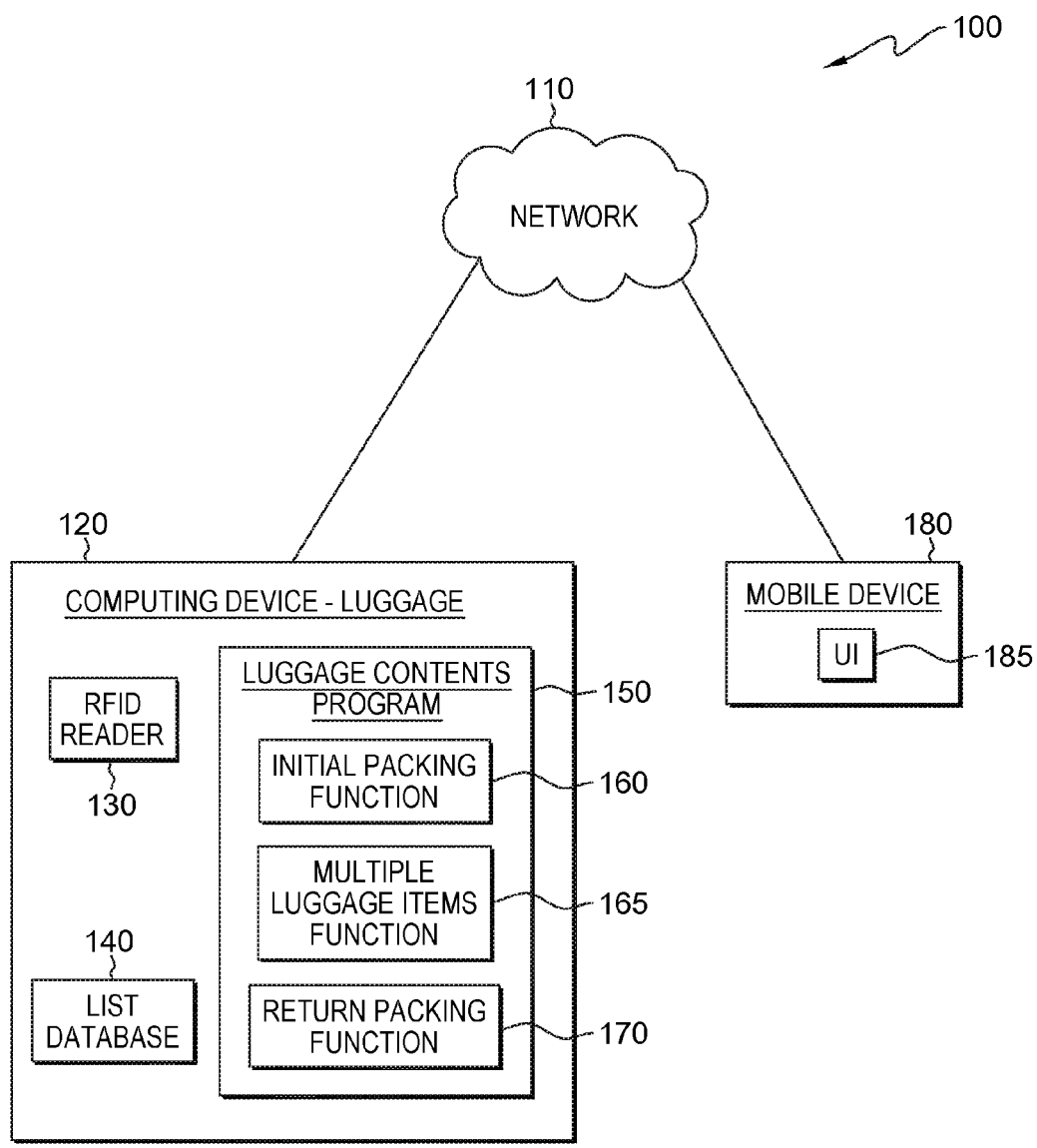
FIG. 1 is a diagram of a computing environment, in accordance with one embodiment of the present invention.

FIG. 1 depicts a diagram of computing environment 100, in accordance with one embodiment of the present invention. FIG. 1 provides only an illustration of one embodiment and does not imply any limitations with regard to the environments in which different embodiments may be implemented.

In the depicted embodiment, computing environment 100 includes computing device luggage 120 and mobile device 180 interconnected over network 110. Network 110 may be a local area network (LAN), a wire area network (WAN) such as the Internet, the public switched telephone network (PSTN), a Bluetooth® connection, any combination thereof, or any combination of connections and protocols that will support communications between computing device-luggage 120, mobile device 180, and, in some embodiments, other servers or computing devices (not shown), in accordance with embodiments of the invention. Network 110 may include wired, wireless, or fiber optic connections. Computing environment 100 may include additional servers, computing devices, mobile devices, wireless communication devices (e.g., radio frequency identification (RFID) tags, near field communication (NFC) devices, or other devices not shown.

Computing device-luggage 120 may be a computing device affixed, or otherwise incorporated into an item of luggage (not shown). In general, computing device-luggage 120 may be any electronic device or computing system capable of receiving and sending data and communicating with mobile device 180 via network 110. In some embodiments, computing device-luggage 120 may be capable of communicating with other servers or mobile devices (not shown). In the depicted embodiment, computing device-luggage 120 includes RFID reader 130, list database 140, luggage contents program 150, initial packing function 160, multiple luggage items function 165, and return packing function 170. Computing device-luggage 120 may include components, as depicted and described in further detail with respect to FIG. 5.

It should be noted that, as used herein, the term "luggage" is not merely restricted to suitcases, but may include other types of containers. For example, luggage may include backpacks, purses, briefcases, handbags, laptop cases, or any other type of container, satchel, or bag utilized to carry one or more items.

RFID reader 130 is an RFID tag reader. RFID reader 130 may include a transceiver for generating a radio frequency (RF) signal, as well as a reader antenna coupled to the transceiver for transmitting the RF signal. RFID reader 130 may be capable of receiving information stored to RFID tags. In some embodiments of the present invention, a user or manufacturer may affix RFID tags to personal items and RFID reader 130 may be designed to retrieve information from the RFID tags as they are placed in the luggage item that contains RFID reader 130 and computing device-luggage 120 or, in some embodiments, upon the luggage item being closed.

It should be noted that while the depicted embodiment describes RFID reader 130 and the use of RFID tags, other types of short-range point-to-point communication technologies may be utilized; for example, near field communication (NFC), Bluetooth®, or other approaches.

In some embodiments, computing device-luggage 120 may further include components to enable location tracking and or location proximity to other devices. For example, some embodiments of computing device-luggage 120 may utilize Bluetooth® to enable computing device-luggage 120 to connect to mobile device 180 or another item of luggage equipped with similar technology. Similarly, computing device-luggage may include a global positioning system (GPS) receiver to allow computing device-luggage 120 to receive GPS coordinate and locate the location of the item of luggage. Computing device-luggage 120 may also be equipped with components that enable computing device-luggage 120 to connect to a cellular network. In such embodiments, location may be determined by multilateration techniques, or GPS coordinates may be relayed to, for example, mobile device 180.

Luggage contents program 150 operates to log the contents of one or more items of luggage, provide recommendations as to items that should be added or removed from luggage, and to generate alerts to be sent to a user via user interface (UI) 185 of mobile device 180. In the depicted embodiment, luggage contents program 150 includes initial packing function 160, multiple luggage items function 165, and return packing function 170.

Initial packing function 160 operates to monitor and log items placed in a luggage item and provide recommendations of items to add or remove from the luggage item. In some embodiments, such recommendations are based upon received information about the current trip such as, for example, destination, purpose of trip (e.g., business, leisure), duration of the trip, itinerary information (e.g., planned activities, hotel reservations, travel arrangements), or other information. In some embodiments, initial packing function 160 utilizes the received information to generate recommendations based on accessing external servers or computing devices for information including, for example, hotel amenity information, weather-related information, airline guidelines, or other types of information.

Multiple luggage items function 165 operates to manage multiple items of luggage and cause initial packing function 160 and return packing function 170 to monitor the contents of multiple items of luggage. In addition, some embodiments of multiple luggage items function 165 may cause an alert to be sent to a user via, for example, UI 185 of mobile device 180 if any of the multiple items of luggage are geographically separated.

Return packing function 170 is similar to initial packing function 160, albeit is designed for a return trip or subsequent stop on a multi-stop trip. Return packing function 170 operates to monitor and log items in luggage based on the log of items created during packing as initial packing function 160 was executing. In some embodiments, return packing function 170 allows a user to add additional items; for example, items obtained during a trip. Return packing function 170 may generate an alert upon determining that one or more items is missing, in order to prevent a user from leaving personal items at the destination of their trip.

List database 140 may be a repository that may be written to and read by luggage contents program 150, initial packing function 160, multiple luggage items function 165, and/or return packing function 170. Item lists may be stored to list database 140. Each item list may include a set of items that are recommended and/or a set of items that are not recommended to be packed in the luggage item based upon a variety of factors. For example, a user may utilize mobile device 180 and UI 185 to create a list for a particular trip. In some embodiments, list database 140 contains lists that were created by a function of luggage contents program 150 based on historical travelling information including, for example, previously brought items. In some embodiments, multiple lists may exist for multiple types of trips (e.g., vacation, business, warm-climate, cold-climate). In some embodiments, travel lists may be adjusted based on a specified duration of the trip. A variety of lists may be entered, and received information about a trip may enable initial packing function 160 to select a list. In some embodiments, item logs may be stored to list database 140. Item logs may indicate a set of one or more items identified as being placed in the item of luggage by initial packing function 160.

Mobile device 180 may be a desktop computer, laptop computer, tablet computer, or smart phone. In general, mobile device 180 can be any electronic device or computing system capable of sending a receiving data, and communicating with computing device-luggage via network 110. Mobile device 180 includes UI 185. Mobile device 180 may include components, as depicted and described in further detail with respect to FIG. 3.

UI 185 operates on mobile device 180 to act as an interface to luggage contents program 150, initial packing function 160, multiple luggage items function 165, and/or return packing function 170. UI 185 may display data received from luggage contents program 150, initial packing function 160, multiple luggage items function 165, and/or return packing function 170 and send received input to luggage contents program 150, initial packing function 160, multiple luggage items function 165, and/or return packing function 170.

It should be noted that while, in the described embodiment, information is input to and communicated to a user via UI 185 of mobile device 180, computing device-luggage 120 may, in some embodiments, include a means to provide input and receive information. For example, in some embodiments, computing device-luggage 120 may have a touch screen or other device capable of allowing a user to interact with luggage contents program 150, initial packing function 160, multiple luggage items function 165, and/or return packing function 170.

Figure 2:
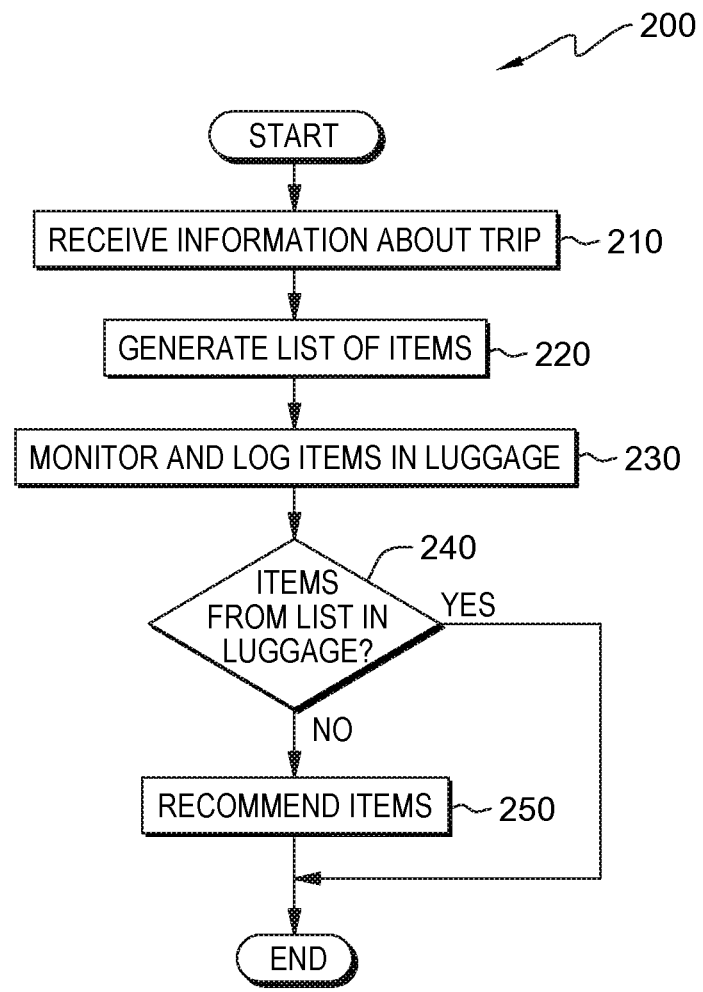
FIG. 2 depicts a flowchart of the steps of an initial packing function executing within the computing environment of FIG. 1, for logging items placed in luggage and providing recommendations, in accordance with one embodiment of the present invention.

FIG. 2 depicts a flowchart 200 of the steps of initial packing function 160, a function of luggage contents program 150, executing within computing environment 100 of FIG. 1, for monitoring items placed into the item of luggage and providing recommendations of items to add or remove from the item of luggage, in accordance with some embodiments of the present invention.

In one embodiment, initially, items to be placed in an item of luggage are equipped with RFID tags or another short-range point-to-point communication technology device. In some instances, a user intending to travel affixes the items with RFID tags. In other instances, a manufacturer of the item may affix respective items with RFID tags. In general, the RFID tag or other short-range point-to-point communication technology device may contain information indicating what the item is, and may be capable of transferring that information to luggage contents program 150 via, for example, RFID reader 130.

Further, in some embodiments, a user may have created one or more predefined lists. For example, a user may have particular medication, toiletries, or other sets of items that are regularly taken on trips. A user may specify a first set of items that should be taken on business trips and a different set of items that should be taken on leisure trips. A variety of lists of items may be created by the user and may depend on a variety of aspects about the trip. In some embodiments, initial packing function 160 creates a list based on previously monitored sets of items included in past trips. Each list may include one or more annotations indicating circumstances around which the list should be used. For example, a list for business travel may be annotated to indicate that the list for business travel should be used only when the user inputs that the trip is a business trip. Other similar annotations may be added based on a variety of factors relevant to trips.

In step 210, initial packing function 160 receives information about a trip. A user at mobile device 180 may utilize UI 185 to input information about the trip in order to assist initial packing function 160 in retrieving an applicable list and identifying items that should be recommended to the user for packing. Information the user may enter about the trip may include, for example, the type of trip (e.g., business, vacation), the expected climate of the destination (e.g., hot, cold), the duration of the trip, or other information. Alternatively, or in addition to, a user may input itinerary information such as hotel reservations, travel reservations, planned activities, or other information.

In step 220, initial packing function 160 generates a list of one or more items. In some embodiments, a user may at mobile device 180 may utilize UI 185 to select a list for the trip. In other embodiments, initial packing function 160 may compare received information about the trip (see step 210) to annotations associated with previously stored lists located on list database 140. In such an embodiment, upon matching the received information about the trip with one or more annotations associated with previously stored lists, initial packing function 160 may select one or more applicable lists. In another embodiment, initial packing function 160 may utilize received information to retrieve information about the trip form external servers or computing devices and create a list. For example, while a user may not have specified that a destination is going to be cold, hot, wet, or dry, initial packing function 160 may use a received destination address, retrieve weather information from an external server or computing device, and utilize that weather information to determine whether attire to be packed should be for warm or cold weather. Similarly, initial packing function 160 may identify shops located at or near various destination locations (e.g., hotel, airport) where various items can be purchased. Initial packing function 160 may access external servers or websites to identify shop inventory, and goods or services that can be purchased at such an identified shop. For example, initial packing function 160 may identify that a user has a destination near a beach, that the user is taking a plane, that the airline has guidelines against allowing liquids on planes, and that there is a drug store near the destination hotel that sells sunblock. As such, in that example, initial packing function 160 may not include sunblock on the list, and may recommend (see step 250) that the user remove sunblock from the item of luggage if the user attempts to pack sunblock. A variety of other similar examples are envisioned by embodiments of the present invention.

In some embodiments, initial packing function 160 may utilize past trips to generate a list of one or more items, rather than base such information merely on lists inserted by a user. For example, initial packing function 160 may identify trends of items taken on particular types of trips (e.g., business trips to cold-weather climates, trips to warm-weather climates located near a body of water, trips where the mode of transportation includes an airplane). Upon identifying such a trend, initial packing function 160 may adjust particular lists. In some embodiments, rather than adjusting the lists, initial packing function 160 may send a request to a user via UI 185 of mobile device 180, informing the user of the item initial packing function 160 has identified, and lists or annotations initial packing function 160 has identified to associate with the item.

In step 230, initial packing function 160 monitors and logs items placed in the item of luggage. In some embodiments, initial packing function 160 monitors and logs the items placed in the item of luggage in real-time as the user places items in the item of luggage. In other embodiments, initial packing function 160 monitors and logs the items placed in the item of luggage upon the user closing the luggage, or upon the user selecting an option via UI 185 of mobile device 180 indicating that the item of luggage is packed and ready for the logging of items. The log of items may be stored to list database 140 along with the received information about the trip, and whether the trip is in progress, or has been completed (and thus, is a past trip). In some instances, a user may place an item that is not affixed with an RFID tag or other type of short-range point-to-point communication technology device. In such an instance, UI 185 of mobile device 180 may allow for a user to indicate that the item has been placed in the item of luggage. In some embodiments, since initial packing function 160 is unable to actively monitor whether such an item is included within the item of luggage, initial packing function 160 may cause return packing function 170 to generate a reminder (e.g., a push notification, text notification) and cause the reminder to be sent to mobile device 180, in order to assist in preventing a user from forgetting the item during the return trip.

In decision 240, initial packing function 160 determines whether items from the generated list (see step 220) have been placed in the item of luggage. In some embodiments, initial packing function 160 may further determine whether items have been placed in the item of luggage that are not located on the generated list. Initial packing function 160 may determine whether items from the generated list (or other items) have been placed in the item of luggage based on accessing the created log of items placed in the item of luggage (see step 230) and comparing the log to the generated list (see step 220). If initial packing function 160 determines that the items placed in the item of luggage correspond to the items from the generated list (decision 240, yes branch), the function is complete. If initial packing function 160 determines that the items placed in the item of luggage to not correspond to the items from the generated list (e.g., there are missing items from the list and/or there are items in excess of the list) (decision 240, no branch), initial packing function 160 generates a recommendation of items to be added to and/or removed from the item of luggage.

In step 250, initial packing function 160 generates a recommendation of items to be added to and/or removed from the item of luggage, based on the determined missing items or items in excess as compared to the generated list. Initial packing function 160 may cause the recommendation to be sent to mobile device 180 for access by a user via UI 185. The recommendation may indicate one or more items initial packing function 160 recommends the user add to the item of luggage, and/or one or more items initial packing function 160 recommends the user remove from the item of luggage. In some embodiments, initial packing function 160 also generates a reason why such a recommendation was made. For example, initial packing function 160 may recommend removing an item because the item is frequently packed but has been infrequently, or never, removed from the item of luggage during previous trips (e.g., during a preselected number of trips). Similarly, initial packing function 160 may recommend removing an item because initial packing function 160 has identified a location nearby the destination where the item can be purchased, and recommends purchasing the item rather than packing. Such a determination may be made when generating the list (see step 220) and may be based on a variety of factors described above. Additionally, initial packing function 160 may take cost into consideration via, for example, airline guidelines, and may recognize that a particular item may cause the item of luggage to exceed an acceptable weight or require a larger item of luggage. Initial packing function may make such a determination based on the dimensions of the item of luggage, known weights of particular items (e.g., gathered online or based on information stored to the RFID tags associated with each item), or sensor data. In some embodiments, a user may prefer to only receive recommendations if the user has forgotten an item, or if items are lacking, rather than if there are additional items. In such an embodiment, if the items of the generated list are present in the item of luggage, initial packing function 160 may forego generating a recommendation to remove items from the item of luggage.

Figure 3:
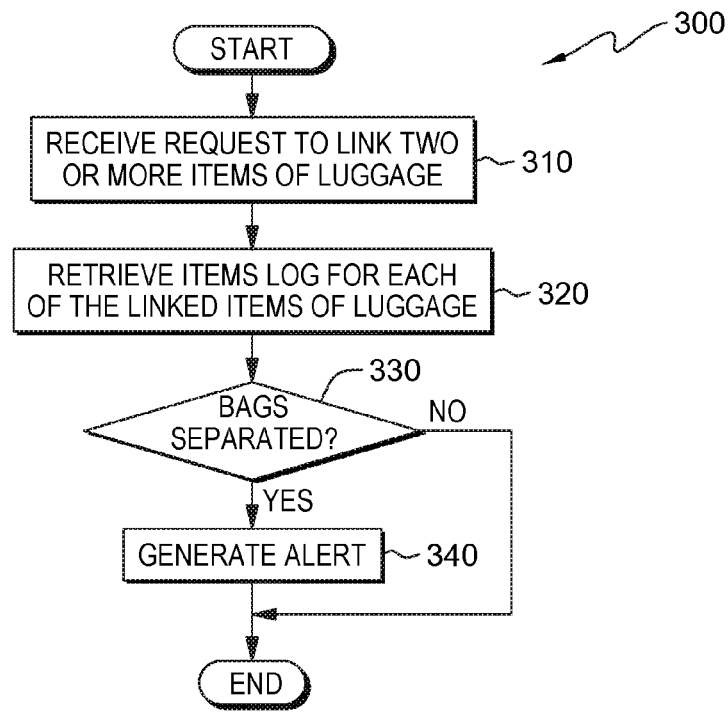
FIG. 3 depicts a flowchart of the steps of a multiple luggage items function executing within the computing environment of FIG. 1, for managing multiple items of luggage, in accordance with one embodiment of the present invention.

FIG. 3 depicts a flowchart 300 of the steps of multiple luggage items function 165, a function of luggage contents program 150, executing within computing environment 100 of FIG. 1, for linking two or more items of luggage and sending an alert if linked items of luggage are separated, in accordance with some embodiments of the present invention.

In step 310, multiple luggage items function 165 receives a request to link two or more items of luggage. A user may request to link two or more items of luggage because they are taking multiple items of luggage on a trip. In some embodiments, a user may specify whether it is expected that the items of luggage should remain, within a predetermined threshold distance, near one another. In other embodiments, this may not be the case (e.g., if a user has a carry-on bag and a bag they are planning on checking with an airline) and the user may specify that the two or more items of luggage, while linked, do not need to remain near one another.

In step 320, multiple luggage items function 165 links two or more items of luggage by causing the logs to be merged for the two or more pieces of luggage, for the analysis performed by initial packing function 160 and/or return packing function 170. While the logs need not be physically merged, multiple luggage items function 165 causes initial packing function 160 and/or return packing function 170 to aggregate the contents of each of the two or more pieces of luggage when determining whether items are, or are not, present in the two or more items of luggage. As such, if "item A" is originally packed in "suitcase A," and "suitcase A" and "suitcase B" are linked, on the return trip, if "item A" is packed in "suitcase B," return packing function 170 will not determine that "item A" is missing (due to "item A" no longer being in "suitcase A"). Effectively, multiple luggage items function 165 causes the combination of the two or more pieces of luggage that are linked to be analyzed as if they are a single item of luggage.

In decision 330, in some embodiments, multiple luggage items function 165 determines whether linked bags have been separated, beyond, or outside of, a predetermined threshold distance. As described above, some embodiments of computing device-luggage 120 may be equipped with components capable of identifying the location of computing device-luggage 120. For example, computing device-luggage 120 may utilize a GPS receiver and cellular network to relay GPS coordinates to mobile device 180, another computing device-luggage, or another computing device or server. Thus, multiple luggage items function 165 may determine whether linked bags have been separated by comparing the GPS coordinates of computing device-luggage 120 to the GPS coordinates of another linked item of luggage. In another embodiment, computing device-luggage 120 may be equipped with Bluetooth® and the two or more linked items of luggage may maintain a Bluetooth® connection with one another. In such an embodiment, multiple luggage items function 165 may consider the two or more linked items of luggage separated if the Bluetooth® connection is severed. If multiple luggage items function 165 determines that the two or more items of luggage have not been separated (decision 330, no branch), the function is complete. However, it should be noted that multiple luggage items function 165 may be configured to periodically determine whether the two or more items of luggage have or have not been separated. If multiple luggage items function 165 determines that the two or more items of luggage have been separated, beyond a predetermined threshold distance (or based on, for example, a severed Bluetooth® connection) (decision 330, yes branch), multiple luggage items function 165 generates an alert (see step 340).

In step 340, multiple luggage items function 165 generate an alert. The alert may indicate that an item of luggage linked to one or more other items of luggage is no longer with the one or more other items of luggage. Such a situation may arise when, for example, a user forgets an item of luggage in a hotel room. In some embodiments, multiple luggage items function 165 causes the alert to be sent to mobile device 180 and accessible to the user via UI 185. In some embodiments, the alert is a push notification or a text message to mobile device 180.

It should be noted that, as described above, the two or more items of luggage may be identified as linked, but it may be indicated that the two or more items of luggage can be separated. In such a circumstance, multiple luggage items function 165 may forego determining whether the bags are separated and sending an alert and may merely cause initial packing function 160 and return packing function 170 to log and track items stored in the linked two or more items of luggage appropriately.

Figure 4:
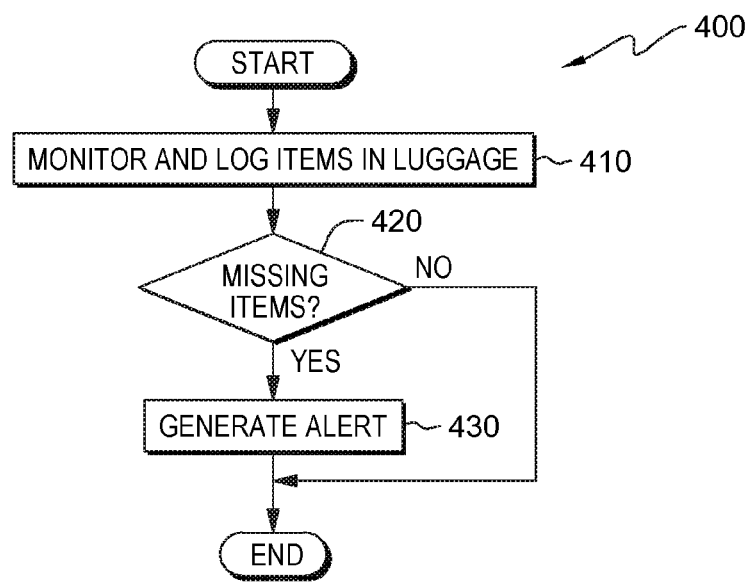
FIG. 4 depicts a flowchart of the steps of a return packing function executing within the computing environment of FIG. 1, for logging items on a return trip and providing alerts if unexpected items are missing from luggage, in accordance with one embodiment of the present invention.

FIG. 4 depicts a flowchart 200 of the steps of return packing function 170, a function of luggage contents program 150, executing within computing environment 100 of FIG. 1, for logging items on a return trip, or additional leg of a trip, and generating alerts if previously logged items are no longer present, in accordance with an embodiment of the present invention.

In general return packing function 170 may initiate execution similarly to when initial packing function 160 is executed. However, return packing function 170 executes after a trip has already been started, but is not yet complete. Thus, return packing function 170 may execute when packing an item of luggage for a return trip, or when packing for an additional leg of a trip.

In step 410, return packing function 170 monitors and logs items stored in an item of luggage. This step is similar to step 230, as described with reference to initial packing function 160 (see FIG. 2).

In decision 420, return packing function 170 determines whether any items are missing from the item of luggage. Return packing function 170 may determine that an item is missing from the item of luggage by comparing the previously stored log (see initial packing function 160, FIG. 2) associated with the current trip to items monitored as being presently stored in the item of luggage. If return packing function 170 determines that there are not missing items (decision 420, no branch), the function is complete. If return packing function 170 determines that there are missing items (decision 420, yes branch), return packing function 170 generates an alert (see step 430).

In step 430, return packing function 170 generates an alert. The alert may indicate the one or more missing items identified by return packing function 170 (see decision 420) and return packing function 170 may cause the alert to be sent to mobile device 180 for access via UI 185. In some embodiments the alert may take the form of a push notification or text message. In some embodiments, UI 185 may provide an interface for allowing the user to choose to ignore or dismiss an alert. For example, return packing function 170 may issue an alert that one or more articles of clothing are missing from the luggage, and the user may be wearing the articles of clothing. In such an example, the user may want to dismiss the alert. In another example, the item may be something that has since been thrown away, or was gifted or sold to another person. It is recognized that there may be a variety of reasons why an item may no longer be present in an item of luggage and that a user may wish to dismiss an alert.

In some embodiments, return packing function 170 may additionally allow a user to add items to the previously stored log utilizing UI 185 of mobile device 180. Such a feature may be desired to account for, for example, items purchased while travelling on the trip. Upon adding such an item to the previously stored log, return packing function 170 will treat the item similarly to items originally included on the original previously stored log.

Figure 5:
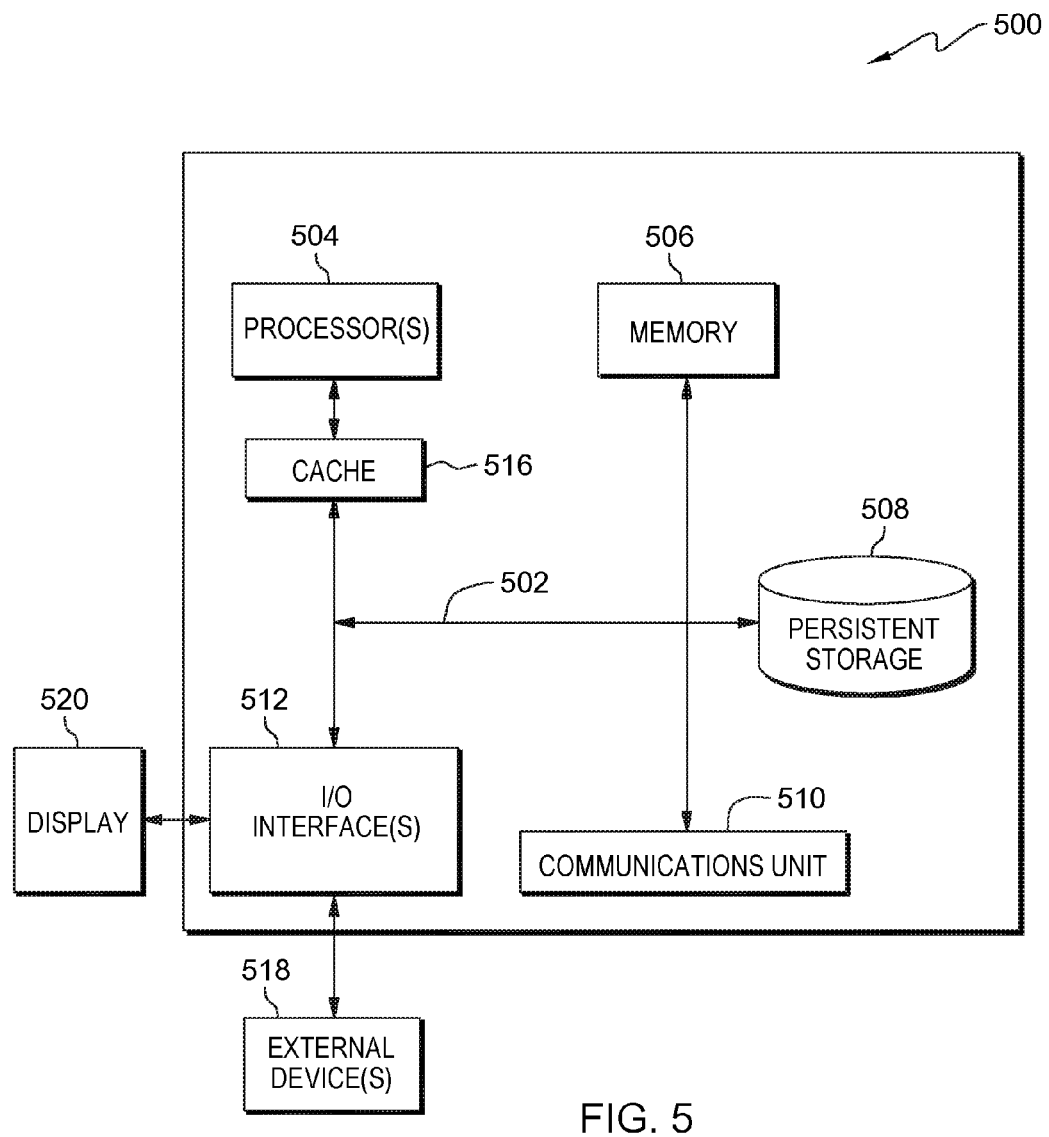
FIG. 5 is a block diagram of internal and external components of the computing device-luggage and mobile device of FIG. 1, in accordance with one embodiment of the present invention.

FIG. 5 depicts a block diagram 500 of components of computing device-luggage 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device-luggage 120 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

List database 140, luggage contents program 150, initial packing function 160, multiple luggage items function 165, and return packing function 170 may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. List database 140, luggage contents program 150, initial packing function 160, multiple luggage items function 165, and return packing function 170 may be downloaded to persistent storage 508 through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., list database 140, luggage contents program 150, initial packing function 160, multiple luggage items function 165, and return packing function 170, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for suggesting an item to pack in an item of luggage, the computer program product comprising:
   one or more computer readable storage media and program instructions stored on the one or more computer readable storage media, the program instructions comprising:
   program instructions to receive a first indication that a user is packing a first item of luggage for a trip, wherein the indication includes information about the trip, wherein the information about the trip comprises duration of the trip, purpose of the trip, expected climate of the destination, itinerary information, and destination, and wherein the first item of luggage includes a global positioning system (GPS) receiver and a touch screen;
program instructions to generate a packing list based on, at least:
the information about the trip; and
weather information of the destination retrieved from an external computing device;
program instructions to receive a request to link the first item of luggage and a second item of luggage for the trip, wherein the request to link the first item of luggage and the second item of luggage specifies that the second item of luggage is to remain within a predetermined threshold distance of the first item of luggage;
program instructions to link, via Bluetooth, the first item of luggage and the second item of luggage such that contents of each respective item of luggage are jointly compared to the packing list;
program instructions to receive, via a short-range point-to-point communication reader of the first item of luggage, a signal from a short-range point-to-point communication device operably affixed to a first item, wherein the short-range point-to-point communication reader is a radio frequency identification (RFID) reader and the short-range point-to-point communication device is an RFID tag;
program instructions to identify the first item based on the signal;
program instructions to compare the first item to the packing list;
program instructions to determine that the first item is an item listed on the packing list;
program instructions to access an inventory of a shop, wherein the shop is located within a threshold distance from a destination included in the information about the trip;
program instructions to determining that the first item is available in the inventory of the shop;
program instructions to generate a recommendation to be presented to the user indicating that the first item be removed from the first item of luggage and purchased at the shop;
program instructions to determine that a second item has been placed in the luggage during a preselected number of previous trips and that the second item was not removed from the luggage during the preselected number of previously trips;
program instructions to cause a recommendation, to be presented to the user, that the second item be removed from the luggage;
program instructions to receive a second indication that the user is packing for return from the trip;
program instructions to compare contents of the first item of luggage and contents of the second item of luggage to the packing list;
program instructions to determine that a third item listed on the packing list is located in neither the first item of luggage nor the second item of luggage;
program instructions to cause a first alert, to be presented to the user, indicating that the third item has not been packed;
program instructions to determine that the second item of luggage is outside of the predetermined threshold distance of the first item of luggage; and
program instructions to cause a second alert, to be presented to the user, indicating that the second item of luggage is outside of the predetermined threshold distance of the first item of luggage.

* * * * *